(12) United States Patent
Itonaga et al.

(10) Patent No.: US 7,061,839 B2
(45) Date of Patent: Jun. 13, 2006

(54) OPTICAL INFORMATION RECORDING MEDIUM AND RECORDING/REPRODUCING APPARATUS FOR SUCH MEDIUM

(75) Inventors: Makoto Itonaga, Yokohama (JP); Atsushi Hayami, Yokohama (JP); Junichiro Tonami, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 681 days.

(21) Appl. No.: 09/917,700

(22) Filed: Jul. 31, 2001

(65) Prior Publication Data

US 2002/0015367 A1    Feb. 7, 2002

(30) Foreign Application Priority Data

Jul. 31, 2000    (JP)    ............................. 2000-230711

(51) Int. Cl.
*G11B 7/00*    (2006.01)

(52) U.S. Cl. ............................. 369/47.35; 369/59.22; 369/124.12; 369/47.21

(58) Field of Classification Search ............. 369/59.11, 369/59.13, 59.15, 59.2, 59.21, 59.25, 124.02, 369/124.06, 124.12, 124.13, 124.14, 124.15
See application file for complete search history.

(56) References Cited

U.S. PATENT DOCUMENTS

| | | | | |
|---|---|---|---|---|
| 4,852,076 A | * | 7/1989 | Ohta et al. ................ | 369/275.4 |
| 5,583,847 A | * | 12/1996 | Takeshima et al. ....... | 369/275.3 |
| 5,790,492 A | * | 8/1998 | Umezawa et al. ........ | 369/53.33 |
| 5,793,741 A | * | 8/1998 | Kashihara et al. ........ | 369/275.4 |
| 5,850,081 A | * | 12/1998 | Yanagisawa ............. | 250/201.5 |
| 5,914,925 A | * | 6/1999 | Lee et al. ................ | 369/44.41 |
| 6,144,625 A | * | 11/2000 | Kuroda et al. ........... | 369/44.27 |
| 6,282,160 B1 | * | 8/2001 | Tateishi et al. .......... | 369/47.22 |
| 6,317,396 B1 | * | 11/2001 | Kuribayashi ............. | 369/44.35 |
| 6,335,916 B1 | * | 1/2002 | Endo et al. .............. | 369/275.4 |
| 6,487,164 B1 | * | 11/2002 | Endoh et al. ............ | 369/275.3 |
| 6,487,165 B1 | * | 11/2002 | Nakajima ................ | 369/275.4 |

FOREIGN PATENT DOCUMENTS

JP    10-222874    8/1998

OTHER PUBLICATIONS

Hayashi, H., et al., "DVD Player Using a Viterbi Decoding Circuit," *IEEE Transactions on Consumer Electronics*, vol. 44, No. 2, May 1998, pp. 268-272.
Bouwhuis, G., et al., *Principles of Optical Disc Systems*, Chapter 2.2., "Scanning Spot Microscopy," pp. 8-23, Adam Hilger, Ltd., Bristol and Boston, 1985.

* cited by examiner

*Primary Examiner*—William Korzuch
*Assistant Examiner*—Tawfik Goma
(74) *Attorney, Agent, or Firm*—Connolly Bove Lodge & Hutz LLP

(57) ABSTRACT

An optical information recording medium (1) is composed of a pit recording area (2), wherein various control information is recorded by a prepit, and a user recording area (3) having a guide groove formed in a groove format, and a phase depth for the prepit and the groove are approximately the same wherein the phase depth is less than or equal to $\lambda/10$, wherein $\lambda$ is a wavelength for reproducing light source. A recording/reproducing apparatus (4) for the optical information recording medium (1) includes decoding means (12) for decoding information by detecting a tangential push-pull reproduced signal from the prepit recording area (2) and detecting an aggregated signal from the user recording area (3).

6 Claims, 8 Drawing Sheets

OPTICAL INFORMATION RECORDING MEDIUM AND RECORDING/REPRODUCING APPARATUS FOR SUCH MEDIUM

BACKGROUND OF THE INVENTION

1. Field of the Invention

The present invention relates to an optical information recording medium such as an optical disc or an optical card, and to a recording/reproducing apparatus for such the recording medium.

2. Description of the Related Art

Generally, a disc area of a recordable optical disc is divided into a user recording area and a pit recording area recorded with various control information. The various control information is such information as an address information related to the user recording area, an information for a most suitable recording power and a recording waveform, a provenance information (such as a manufacturing information), or a copy administrative information, or a copy protection information etc.

The information of which to be recorded and the recording method for such information depend on a format of the user recording area. The user recording area contains a groove for tracking. There are provided format types of a groove format for a recording information only on the groove and a land-groove format for the recording information on both land and groove.

As focusing on a physical figuration of the groove, there are two differences in the groove format and land-groove format. First, the groove format has a physically narrower track pitch than the land-groove format. The track pitch for land-groove format in view of information is a width of the land or groove, and the physical track pitch for the land-groove format will be a sum of both widths. On the other hand, the groove format has a physical track pitch equivalent to the track pitch in view of information, and the groove width for the recording information is equivalent to a half width of the track pitch. Accordingly, the track pitch for groove format is equivalent to approximately a half width of the track pitch of land-groove format.

Second, the groove format has a shallower phase depth than the land-groove format. The land-groove format utilizes a groove having a phase depth of approximately $\lambda/6$ to suppress cross-talk from the land to groove or the groove to land at the reproducing condition. The "$\lambda$" represents a wavelength of reproducing light source. On the other hand, the groove format utilizes a shallower phase depth because it has a thinner groove width that the reproducing output of recorded information is low. Typically, the phase depth is less than $\lambda/8$. The phase depth depends on a disc system, for example, a magneto-optical disc utilizes a $\lambda/8$ phase depth. Further, disc types of a phase change optical disc, such as CD-RW and DVD-RW discs, utilize a phase depth of less than $\lambda/10$, desirably less than $\lambda/15$. The reason why the phase depth of groove is shallower in the latter is that to maintain compatibility with a ROM type disc in a signal to be used. Further, a system for a next generation such as the system using a semi-conductor laser of 400 nm wavelength utilizes shallower groove of less than $\lambda/10$, desirably $\lambda/13$ to $\lambda/20$ to obtain higher level of reproducing signal.

The following is the reason why that the groove format is superior to the land-groove format. The land-groove format has a problem of having a different amount of offset for a land or a groove at the optimum operating point in a focus or a tracking servo system under recording/reproducing operation. On the other hand, as to the groove format, the information is recorded on to a groove of single stroke line from inner to outer circumference so that the disc format can be simple and the recording/reproducing operation for the disc can be simple. Further, a disc of the ROM type also has a groove of single stroke line so that the compatibility of format between a ROM type disc and a recordable disc can be maintained.

The groove format does not have a problem of having a different offset amount in optimum operating point of the focus and tracking servo system. Accordingly, the groove format is considered to be advantageous for the next generation format. A recording/reproducing method for the groove format has been disclosed in the Japanese Patent Laid-open Publication No. 10-222874 that the information is recorded on or reproduced from an optical information recorded medium having an information area of a Lin (Lead-in) area where the PCA, PMA, an address information and a control information necessary for recording and reproducing superimposed on a wobbling pregroove as a preformat information, a program area where the user information constitutes a pregroove and a Lout (Lead-out) area, from an inner to outer circumferences, by being synchronized with preformat information and controlling revolution of the disc and a pulse for recording data. The pregroove is wobbled based on the standard signal having a predetermined frequency combined with an address information and a control information.

However, if the control information has been recorded wobblingly, it is difficult to wobble the groove in high speed and consequently, an amount of information which can be recorded decreases. To solve this problem, information is recorded by utilizing a pit format like the land-groove format.

The pit and groove should be formed in a same depth because the pit and groove is recorded on a photo-register applied to an original glass disc with an original disc recording apparatus. Based on the original disc recorded as mentioned above, a plastic disc will be manufactured. A plastic molding and transcription or the like for the pit and groove slightly differs from each other but the phase depth of the pit and groove will be technically the same. A disc manufactured as mentioned above having the same phase depth of the pit and groove with less than $\lambda/10$ nm can provide with only a very small amount of reproducing signals. Such a reproducing signal has a small level with less S/N ratio, which is not sufficient for decoding. In addition, making different phase depth for each pit and groove will cause a manufacturing process for optical information recording disc complicated and decrease a manufacturing productivity.

SUMMARY OF THE INVENTION

Accordingly, in consideration of the above-mentioned problems of the related art, an object of the present invention is to provide an optical information recording medium (1) including a pit recording area (2) recorded with various control information by a prepit and a user recording area (3) having a guide groove, wherein a track is formed by groove format and a phase depth for the prepit and the guide groove are approximately less than or equal to $\lambda/10$, where $\lambda$ is the wavelength of a light source (5) for reproducing information from the optical information recording medium (1).

Another object and further aspect of the present invention is to provide a recording and reproducing apparatus (4) for an optical information recording medium (1) including a pit recording area recorded with various control information by a prepit, and a user recording area (3) having a guide groove, wherein a track for the user recording area is formed in groove format, the recording and reproducing apparatus including decoding means (12) for decoding information from the optical information recording medium (1) by detecting a signal in a form of a tangential push-pull reproduced signal from the pit recording area (2), and detecting another signal in a form of an aggregated signal from the user recording area (3).

Another object and further aspect of the present invention is to provide a recording and reproducing apparatus (4) in which the decoding means (12) includes a waveform equalizing circuit (13) for obtaining a desirable partial response characteristic from the tangential push-pull reproduced signal.

Another object and further aspect of the present invention is to provide a recording and reproducing apparatus (4) in which the decoding means (12) is a viterbi decoder.

Another object and further aspect of the present invention is to provide a recording and reproducing apparatus (4) in which a partial response polynomial equation for equalizing reproduced signal in the partial response characteristic is $1+D-D^2-D^3$.

Other objects and further features of the present invention will be apparent from the following detailed description when read in conjunction with the accompanying drawings.

DETAILED DESCRIPTION OF THE PREFERRED EMBODIMENTS

First Embodiment

Figure 1:
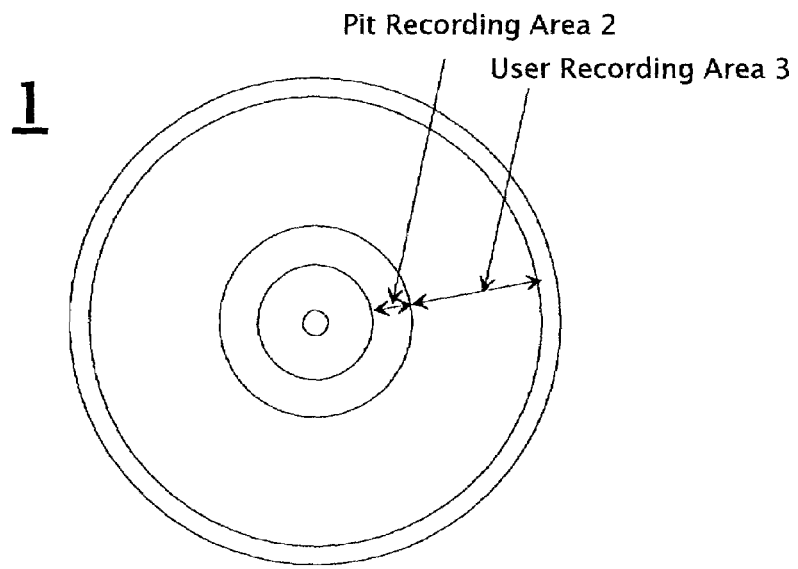
FIG. 1 is a plan view of an optical information recording medium according to a first embodiment of the present invention.
Figure 2:
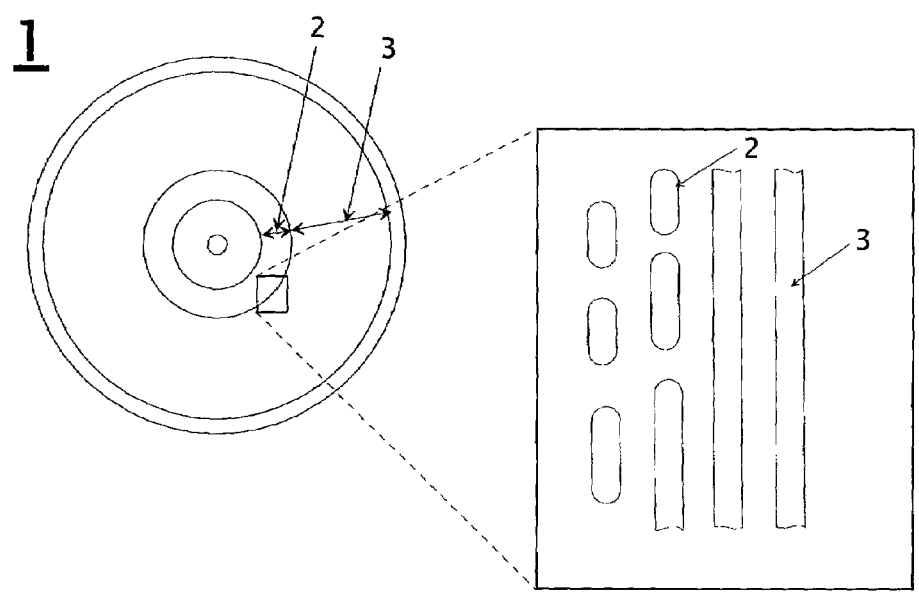
FIG. 2 is a partially enlarged plan view of a border portion of a user recording area and a pit recording area of the optical information recording medium shown in FIG. 1 according to the present invention.

FIG. 1 is a plan view of an optical information recording medium and FIG. 2 is a partially enlarged plan view of a border portion of a user recording area and a pit recording area of the optical information recording medium shown in FIG. 1.

As shown in FIG. 1, an optical information recording medium 1, such as an optical disc, is formed with a pit recording area 2 wherein various control information is recorded by a prepit adjacent to the disc center, a user recording area 3 having a guide groove, adjacent to the pit recording area 2. The user recording area 3 is formed by a groove format. Respective phase depth of a prepit and a groove in the user recording area 3 is approximately the same and the depth is less than $\lambda/10$ wherein the $\lambda$ is a wavelength of a light source for reproducing signal.

The reason why the phase depth is less than $\lambda/10$ is because a larger level of reproduced signal can be obtained. It is desirable to have phase depth for prepit and groove less than $\lambda/13$ to obtain a reproduced signal at practical use. Further, it is necessary to have phase depth less than $\lambda/20$ to obtain a tracking error signal in good condition. Accordingly, the phase depth for prepit and groove are preferred to be in a range of $\lambda/13$ to $\lambda/20$ to obtain both reproduced signal and tracking error signal in good condition.

A control information includes information for reproducing/recording control such as a construction for disc format and address, disc ID (identification) copy administration information such as a name of manufacturer or copy protection, information for preventing copy and protecting contents, an optimum recording power, a strategy for an optimum recording, and control information for recording or reproducing at an optimum power.

Some portion of the control information may be recorded in the pit recording area 2 by the same way of recording method for the user recording area 3.

As the control information is recorded in the pit recording area 2 by prepit and the user recording area 3 consists of a guide groove so that a large capacity of information can be recorded in the user recording area 3. The pit recording area 2 can be formed in the area other than the area contiguous to the center of the optical information recording medium 1.

Figure 3:
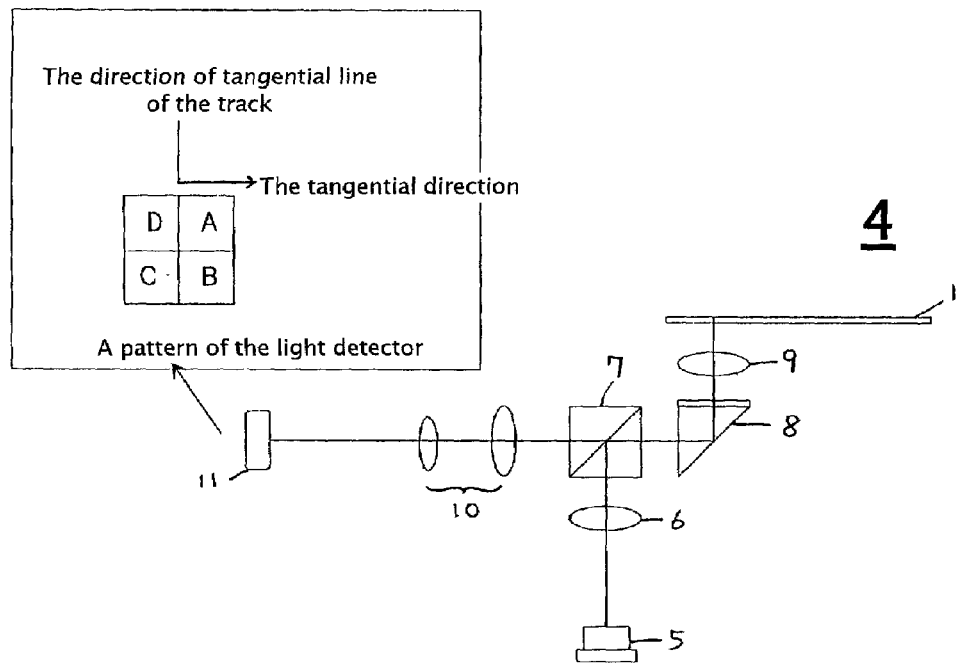
FIG. 3 is a block diagram for explaining a recording and reproducing apparatus for an optical information recording medium according to a second embodiment of the present invention.

FIG. 3 is a block diagram for explaining recording/reproducing apparatus for an optical information recording medium according to the present invention. A recording/reproducing apparatus 4 is composed of a light source 5 such as semi-conductor laser, a collimator lens 6 for condensing light outputted from the light source 5, a polarizing beam splitter 7 for polarize and separate a light passed through the collimator lens 6, a prism 8 for reflecting light separated by the polarizing beam splitter 7, an object lens 9 for condensing light reflected by the prism 8 onto an optical information recording medium 1, a plurality of cylindrical lens 10 for providing astigmatism of reflection light from the optical information recording medium 1 through the object lens 9, the prism 8 and the polarizing beam splitter 7, and a light detector 11 for receiving reflection light from the optical information recording medium 1 through the cylindrical lens 10.

The light detector 11 has four areas defined as A, B, C and D in the direction of a tangential line of the track and in the tangential direction orthogonal to the tangential line. A user information reproduced from the user recording area 3 is detected as an aggregated signal of signals a, b, c and d (a+b+c+d) which are outputted from each of the above four areas A, B, C and D. This is called an aggregated detecting method.

A tracking error signal is detected by the difference of signals divided in the direction of tangential line of the track, i.e. (a+b)−(c+d). Simultaneously, an address information recorded by wobbling is also detected by this error signal.

A focus error signal is detected by the difference of signals from the opposing corner, i.e. (a+c)−(b+d) A pit signal reproduced from the pit recording area 2 is detected by the difference of two areas divided in the tangential direction orthogonal to the track, i.e. (a+d)−(b+c). This is called a tangential push-pull detecting method (hereinafter referred to as "PP detecting method"). The signal (a+d)−(b+c) is hereinafter referred to as tangential push-pull reproduced signal.

The recording and reproducing apparatus 4 operates, in a reproducing mode, a light outputted from the light source 5 is exposed on the optical information recording medium 1 through the collimator lens 6, the polarizing beam splitter 7, the prism 8 and object lens 9, and a refection light from the recording medium 1 is reflected through the object lens 9, the prism 8, the beam splitter 7 and the cylindrical lens 10 and received by the light detector 11, and then the user information, tracking error information, focus error information and pit information are obtained by calculation of signals outputted from the four areas A, B, C and D.

In a recording mode, a light outputted from the light source 5 is exposed on the recording medium 1 through the collimator lens 6, the polarizing beam splitter 7, the prism 8 and object lens 9 to record information on the recording medium 1.

The output of reproduced signal has been detected by using the aggregated detecting method and the PP detecting method corresponding to phase depth of the pit and standardized spatial frequency. The shape of the pit is rectangular. The standardized spatial frequency is defined by the number of aperture NA, wavelength λ and linear velocity of the recording medium 1.

Figure 4:
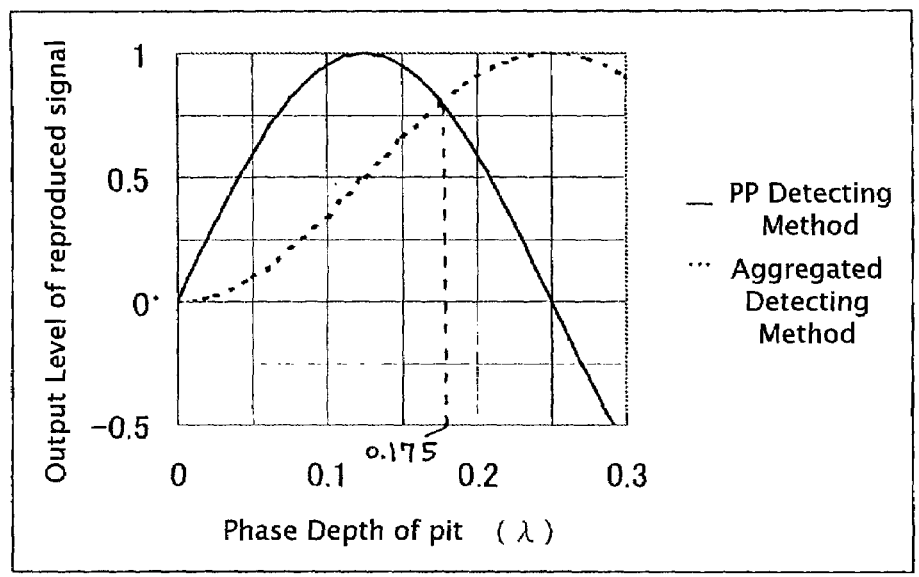
FIG. 4 is a diagram showing a reproduced signal output in relation to a phase depth of a pit.

FIG. 4 is a diagram showing a reproduced signal output in relation to phase depth of a pit. The horizontal axis is a phase depth of pit (λ), and the vertical axis is an output level of reproduced signal. The solid line shown in FIG. 4 is the result of using the PP detecting method and the dotted line shown in FIG. 4 is the result of using the aggregated detecting method.

As shown in FIG. 4, the output of reproduced signal for the aggregated detecting method increases as the phase depth becomes deeper and it becomes maximum at λ/4, and then decreases. On the other hand, the output of reproduced signal for the PP detecting method increases as the phase depth becomes deeper and it becomes maximum at λ/8, and then it decreases. The output of reproduced signal for the PP detecting method is higher than the output of reproduced signal for the aggregated method less than or equal to 0.175λ. This indicates that the PP detecting method can obtain higher output signal level than the aggregated detecting method if the phase depth of pit is less than or equal to λ/10. In addition, a reproduced signal in good condition, and a tracking error signal in good condition can be obtained when the phase depth of pit is within the range of λ/13 to λ/20.

Figure 5:
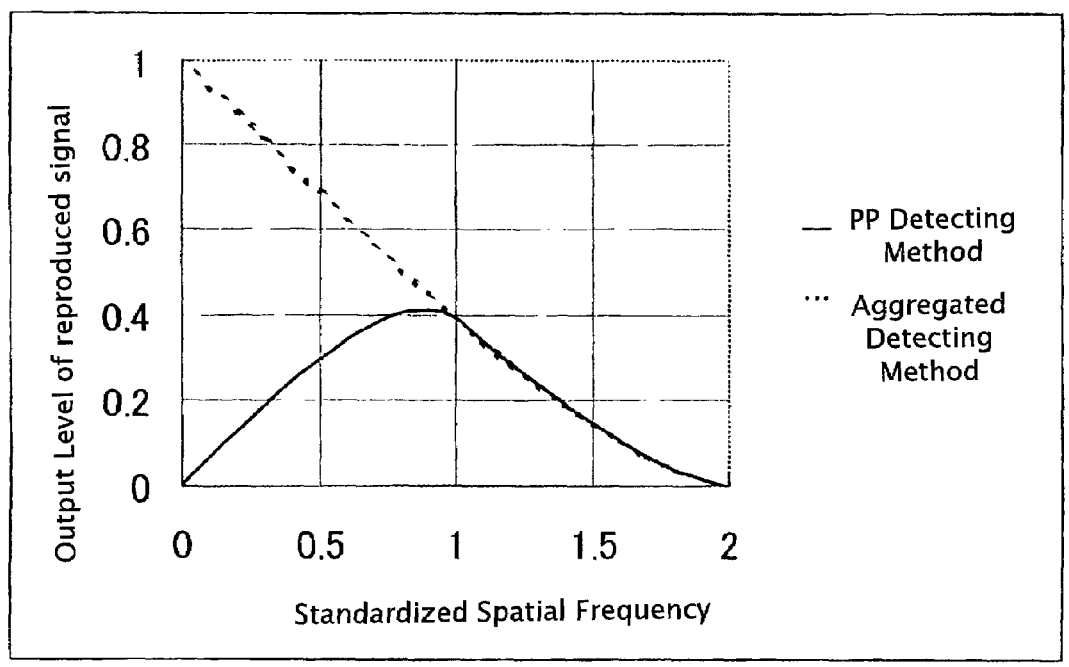
FIG. 5 is a diagram showing a signal output in relation to a standardized spatial frequency.

FIG. 5 is a diagram showing a signal output in relation to a standardized spatial frequency. The horizontal axis is a standardized spatial frequency, and the vertical axis is an output level of reproduced signal. The solid line shown in FIG. 5 is the result of using the PP detecting method and the dotted line shown in FIG. 5 is the result of using the aggregated detecting method.

In FIG. 5, the output of reproduced signal for the aggregated detecting method decreases as the standardized spatial frequency increases. On the other hand, the output of reproduced signal for the PP detecting method increases as the spatial frequency increases and it becomes maximum at 0.9, and then decreases. Comparing with the aggregated detecting method, the PP detecting method has characteristic resemble to the differential detection without the low frequency element. This indicates that a reproduced signal with low error ratio can be obtained from the recording medium 1 by using partial response conformed with this characteristic.

Figure 6:
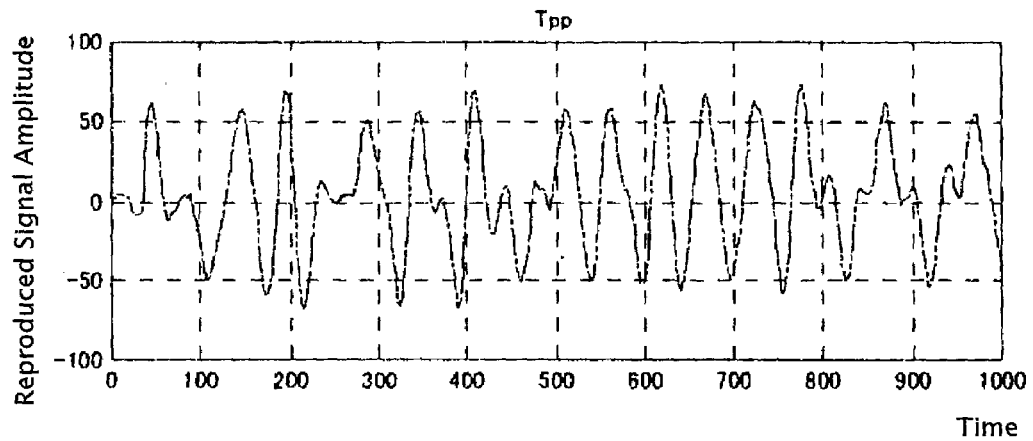
FIG. 6(a) is a diagram showing a reproduced signal from a DVD disc by a PP detecting method.
FIG. 6(b) is a diagram showing a reproduced signal from a DVD disc by an aggregated signal method.
Figure 6:
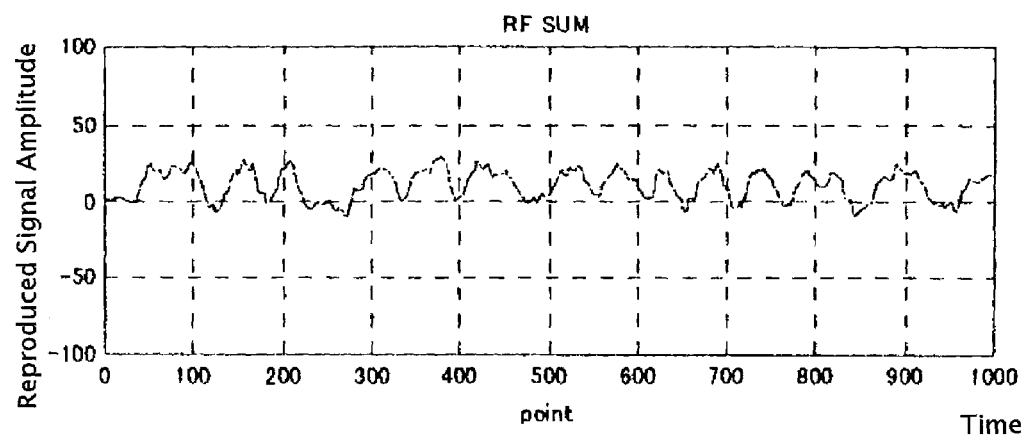

FIG. 6(*a*) is a diagram showing a reproduced signal reproduced by using a DVD (Digital Versatile Disc) player by the PP detecting method, and FIG. 6(*b*) is a diagram showing a reproduced signal reproduced by using a DVD player by the aggregated signal method.

A DVD player including the reproducing apparatus shown in FIG. 3 reproduces the DVD disc. In FIGS. 6(*a*) and 6(*b*), the horizontal axis is time, and the vertical axis is an amplitude of the reproduced signal.

As shown in FIG. 6, the amplitude of reproduced signal using the PP detecting method is bigger than that of the aggregated detecting method.

Figure 7:
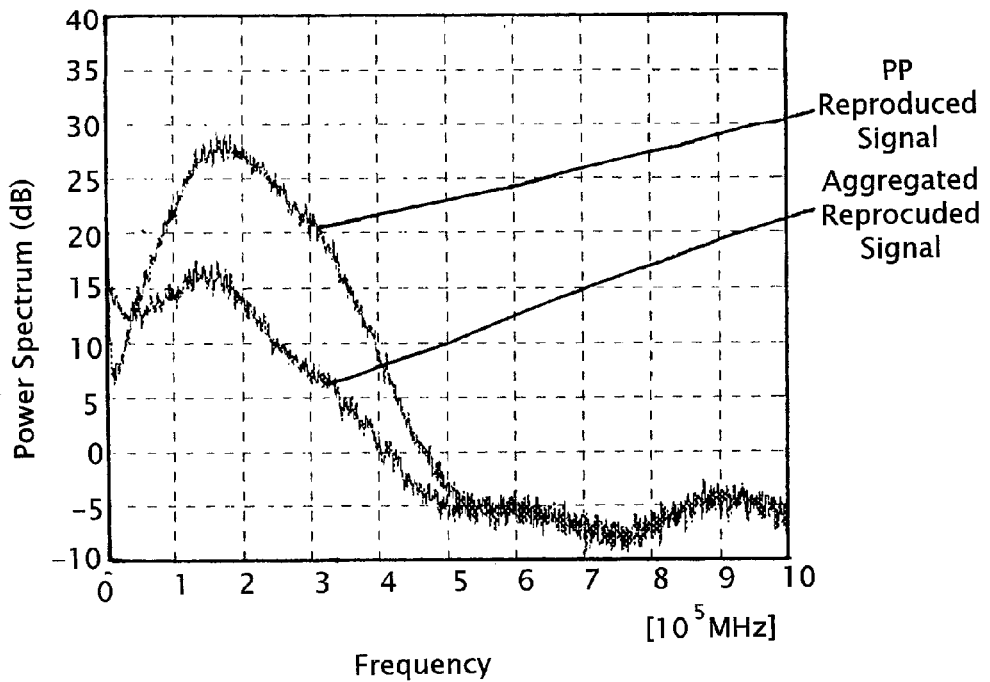
FIG. 7 is a diagram showing a power spectrum of reproduced signal by the PP detecting method and the aggregated signal method.

FIG. 7 is a diagram showing a power spectrum of reproduced signal by the PP detecting method and the aggregated detecting method reproduced by the DVD player having the reproducing apparatus shown in FIG. 3. In FIG. 7, the horizontal axis is a frequency (MHz) and the vertical axis is a power spectrum (dB). As shown in FIG. 7, the signal ratio in relation to noise for signal reproduced by the PP detecting method is bigger than that of the aggregated detecting method. As mentioned above, a reproduced signal in good condition can be obtained by the PP detecting method.

Figure 8:
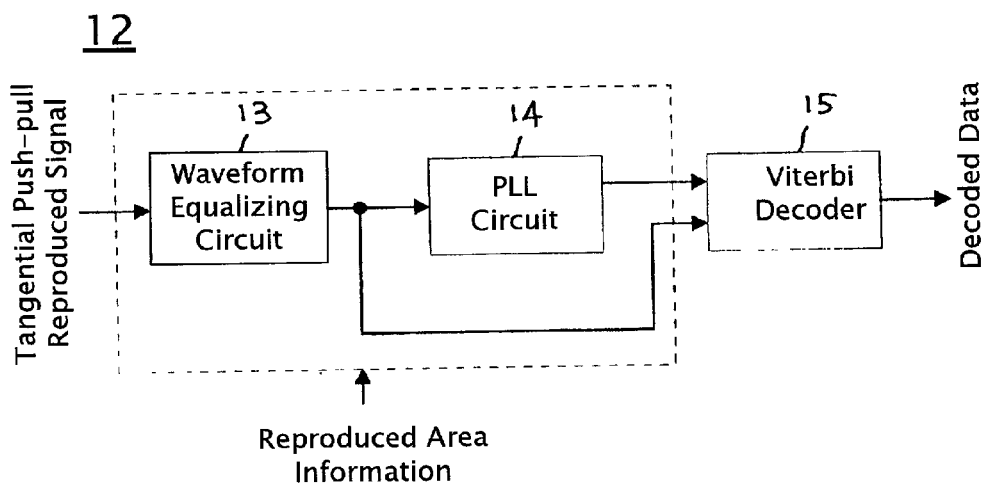
FIG. 8 is a block diagram showing a decoding circuit for decoding a tangential push-pull reproduced signal.

FIG. 8 is a block diagram showing a decoding circuit 12 for decoding a tangential push-pull reproduced signal. The decoding circuit 12 includes a waveform equalizing circuit 13 for equalizing a tangential push-pull reproduced signal obtained from the light detector 11 shown in FIG. 3 by compensate the power spectrum in partial response (hereinafter referred to as "PR") characteristic, a PLL circuit 14 for outputting a bit clock for sampling a reproduced signal equalized in the PR characteristic, and a viterbi decoder 15 for decoding the reproduced signal by synchronizing with the bit clock and using the output signal from the waveform equalizing circuit 13. The compensation of the power spectrum is to obtain a desirable PR characteristic based on spectrum restriction of the spatial frequency defined by an optical system.

An A/D converter is necessary for converting a signal from analogue form into digital form before the waveform equalizing circuit 13 and between the viterbi decoder 15. However, it is not shown in FIG. 8.

The reproduced signal of the pit recording area 2 is decoded as follows. The tangential push-pull reproduced signal is inputted to the waveform equalizing circuit 13, and the waveform equalizing circuit 13 outputs a signal equalized in a desirable PR characteristic (equalized signal), and the PLL circuit 14 outputs a bit clock for sampling the equalized signal, and the equalized signal from the waveform equalizing circuit 13 is inputted to the viterbi decoder 15 synchronized with the bit clock, and the viterbi decoder 15 decodes the equalized signal by sampling the signal.

The reproduced signal of the user recording area 3 can also be decoded in the same way as explained above by using an aggregated signal.

Figure 9:
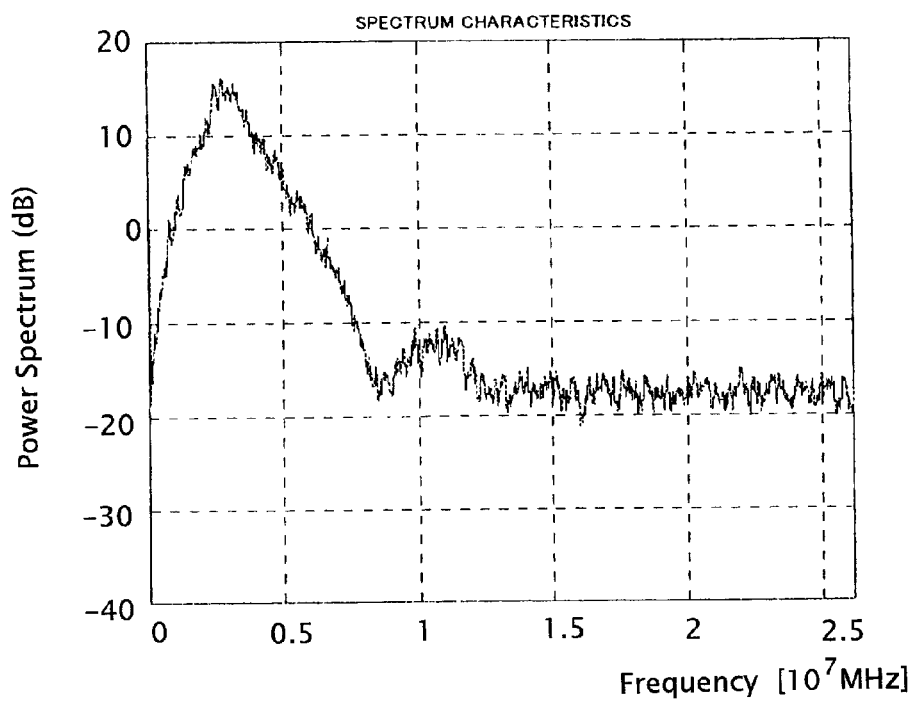
FIG. 9 is a diagram showing a power spectrum of a PR(1, 1, 0, −1, −1) characteristic signal.

A decoding method for the pit recording area 2 for a DVD disc by using a tangential push-pull reproduced signal is explained as follows. FIG. 9 is a diagram showing a power spectrum of the PR(1, 1, 0, −1, −1) characteristic signal. The horizontal axis is frequency (Hz) and the vertical axis is power spectrum (dB).

As shown in FIG. 7, the cutoff frequency for spatial frequency spectrum is approximately 6 MHz. In order to equalize the reproduced signal into the PR (1, 1, 0, −1, −1) characteristic, the spectrum of spatial frequency within the range of 6 MHz to 8 MHz is boosted after the tangential push-pull reproduced signal is compensated the power spectrum and equalized in desired PR characteristic by the waveform equalizing circuit 13. The frequency of bit clock is 26.16 MHz, which is used for DVD clock.

Figure 10:
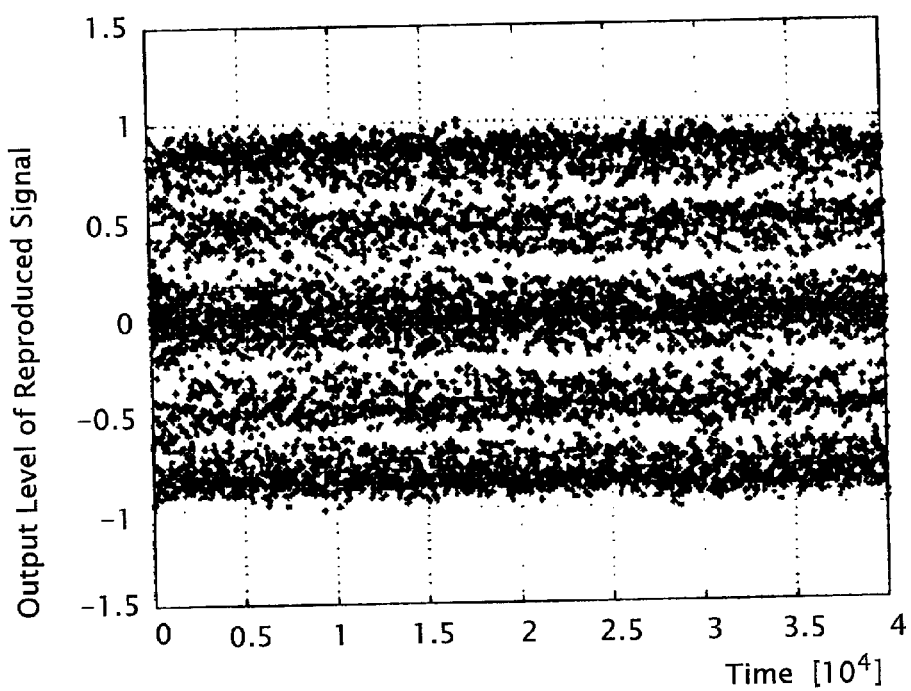
FIG. 10 is a diagram showing an eye-pattern by plotting a sample point of waveform having the power spectrum shown in FIG. 9.

A sampling of the reproduced signal outputted from the waveform equalizing circuit 13 is taken by the bit clock outputted from the PLL circuit 14, and an eye-pattern corresponding to five (5) point of the PR (1, 1, 0, −1, −1) characteristic shown in FIG. 10 is obtained. FIG. 10 is a diagram showing an eye-pattern by plotting a sample point of waveform having a power spectrum shown in FIG. 9. The horizontal axis is time, and the vertical axis is output level of reproduced signal.

Figure 11:
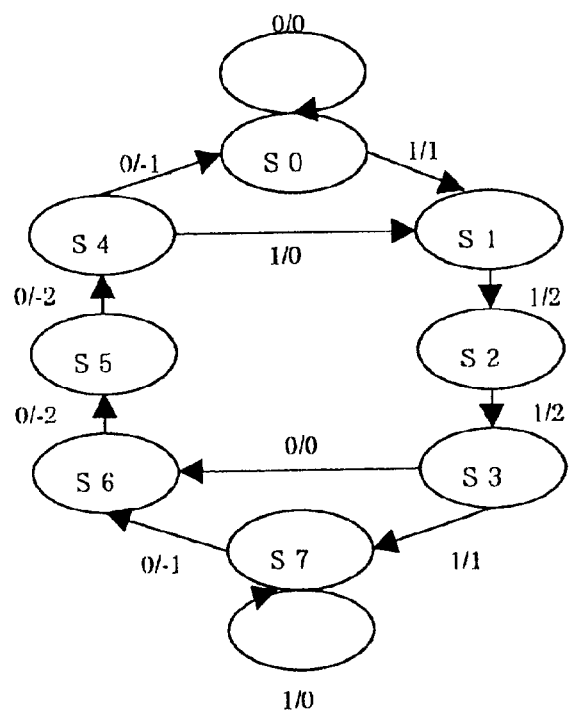
FIG. 11 is a diagram for explaining an intergradation of viterbi decoder suitable for the PR(1, 1, 0, −1, −1).

FIG. 11 is a diagram for explaining an intergradation of viterbi decoder suitable for the PR (1, 1, 0, −1, −1). S0 through S7 indicate the status of viterbi decoder. In FIG. 11, Each S0, S1, S2, S3, S4, S5, S6, and S7 represents decoded three bits (000), (001), (011), (111), (000), (100), (110), (111) respectively. The arrows in FIG. 11 show intergradation from one status to the next status (for example, S0 to S1) with output in relation to input. The figure indicated as */* between the status S0 to S7 represents (input)/(output) bit. In a case of S0 to S1 status, the output bit is "1" when the input bit is "1".

The sampling of the reproduced signal is decoded by the viterbi decoder 15 having eight states transition corresponding to the PR (1, 1, 0, −1, −1). Decoding of the user recording area 3 can also be carried out by using an aggregated reproduced signal instead of a tangential push-pull reproduced signal.

As described above, there provided the optical information recording medium 1 having the pit recording area 2 wherein various control information are recorded by using a prepit contiguous to the center of the medium, and having an user recording area 3 wherein a guide groove contiguous to the outer circumference of the pit recording area 2 and a track in groove format have been formed therein. There also provided the viterbi decoder 15 for decoding information from the pit recording area 2 by detecting the tangential push-pull reproduced signal, and decoding information from the user recording area 3 by detecting the aggregated signal so that the decoding of reproduced signal in good condition can be carried out.

Further, the optical information recording medium 1 includes the pit recording area 2 having recorded various control information by a prepit contiguous to the center of the medium, and the user recording area 3 having a guide groove contiguous to the pit recording area 2 so that large capacity for recording information can be increased.

As the reproducing characteristic for a tangential push-pull reproduced signal in the spectrum of light transmission line is limited to the given spectrum for bit clock, the tangential push-pull reproduced signal should be equalized with the PR polynomial equation in higher order, such as the PR (1, 1, 0, −1, −1) to equalize in a partial response characteristic. As for a DVD, the spectrum is limited to ¼ of the spectrum for bit clock. The PR (1, 1, 0, −1, −1) can be indicated as $1+D-D^3-D^4$, wherein D is an operator having time delay of one (1) bit.

On the other hand, the aggregated signal is detected by an equalizing characteristic of a third order PR polynomial equation such as $p+qD+qD^2+pD^3$ (p and q are natural numbers) and as PR (p, q, q, p), and the construction of circuit can be simplified. Further, the circuit construction can be communized by adopting the third order PR polynomial equation for tangential push-pull reproduced signal decoding.

In the next place, there provided an optical information recording medium wherein an information is recorded in the pit length twice the standard pit, and the tangential push-pull reproduced signal is detected and decoded in common with the detection of aggregated signal.

Figure 12:
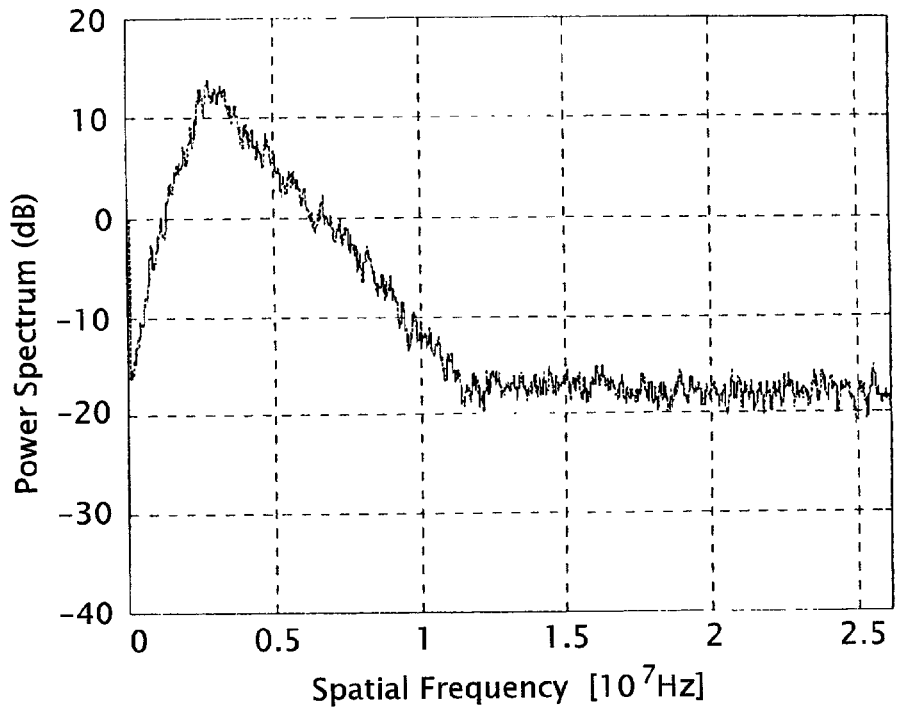
FIG. 12 is a diagram showing a power spectrum for a signal having a characteristic of the PR(1, 1, 0, −1, −1).

FIG. 12 is a diagram showing a power spectrum for a signal having characteristic of the PR (1, 1, 0, −1, −1). The horizontal axis is frequency (Hz) and the vertical axis is power spectrum (dB). The PR (1, 1, 0, −1, −1) characteristic is so called EPR4 characteristic.

The EPR4 characteristic can be described as a third order partial response polynomial equation $1+D-D^2-D^3$. As shown in FIG. 12, the EPR4 characteristic requires approximately ½ of frequency spectrum for bit clock. The power spectrum for the EPR4 characteristic is nearly equal to the power spectrum for a PP reproduced signal shown in FIG. 7 so that its waveform can be equalized in the EPR4 characteristic by double the length of pit and bit clock with ½ frequency.

The bit clock can be made into ½ by dividing the clock frequency into ½ using system controller means not shown with reproduced area information representing the prepit area.

Figure 13:
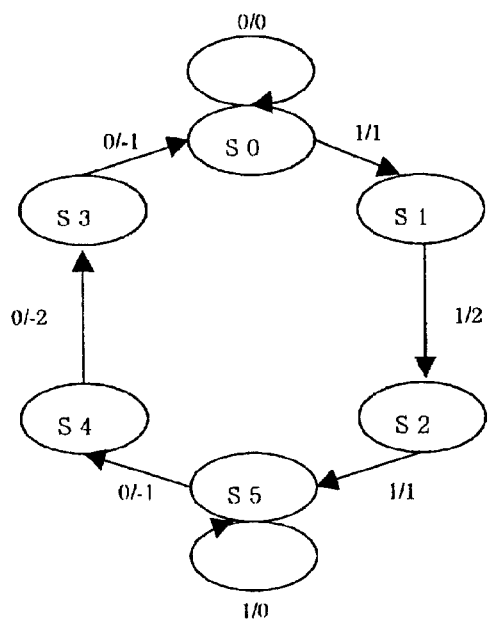
FIG. 13(a) is a diagram for explaining an intergradation of viterbi decoder for a PP reproduced signal in the PR(1, 1, 0, −1, −1).
FIG. 13(b) is a diagram for explaining an intergradation of viterbi decoder for an aggregated reproduced signal in the PR(1, 1, 0, −1, −1).
Figure 13:
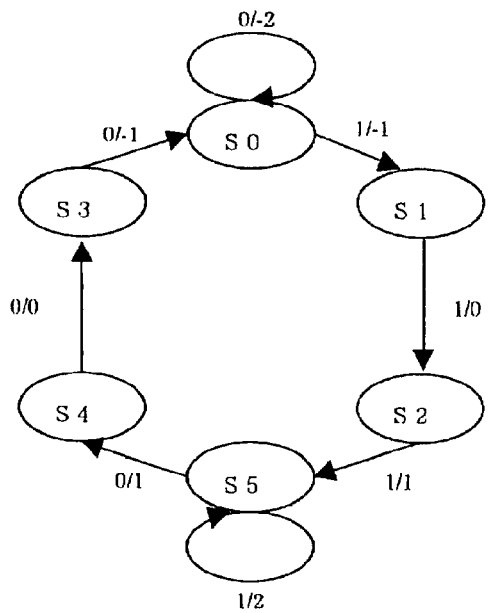

FIG. 13(*a*) is a diagram for explaining an intergradation of viterbi decoder for a PP reproduced signal in the PR (1, 1, 0, −1, −1). FIG. 13(*b*) is a diagram for explaining an intergradation of viterbi decoder for an aggregated reproduced signal in the PR (1, 1, 0, −1, −1). In FIG. 13, Each S0, S2, S2, S3, S4, and S5 represents decoded three bits (000), (001), (011), (111), (000), (100), (110), and (111) respectively in the viterbi decoder. The arrows in FIG. 13 show intergradation from one status to the next status (for example, S0 to S1) with output in relation to input. The figure indicated as */* between the status S0 to S7 represents (input)/(output) bit. In a case of S0 to S1 status, the output bit is "1" when the input bit is "1".

The viterbi decoder shown in each FIGS. 13(*a*) and (*b*) is different in its targeted value for decoding, and consequently, a common circuitry can be used for decoding the aggregated reproduced signal and the PP reproduced signal. After the aggregated reproduced signal is equalized in the PR (p, q, q, p), the same decoder can be used for decoding a PP reproduced signal to simplify the decoding circuitry.

It is obvious that the reproducing operation described above can apply to, not only to reproduce information recorded in the pit recording area 2 in twice length of the standard bit length, but also to reproduce information recorded in multiple of standard bit length. Further, the circuitry of recording/reproducing apparatus 4 can be simplify as the bit length recorded in the pit recording area 2 has length n (n; natural number) times of the standard bit length, and the bit clock is 1/n in frequency, and the state transition for viterbi decoder 15 applies to the PR characteristic.

According to an aspect of the present invention, there provided an optical information recording medium having a pit recording area with various control information recorded by a prepit, and having an user recording area with guide groove wherein track has been formed in groove format therein, and the phase depth of the prepit and the groove is approximately the same, and the phase depth is less than or equal to λ/10 when the wavelength of reproducing light source is λ, so that a large capacity of information can be recorded in the user recording area.

According to another aspect of the present invention, there provided a recording/reproducing apparatus for an optical information recording medium having a pit recording area with various control information recorded by a prepit, and having an user recording area with a guide groove wherein a track is formed in a groove format therein, including a decoding means for detecting a tangential push-pull reproduced signal from the pit recording area, and detecting an aggregated reproduced signal from the user recording area for decoding operation so that the reproduced signal can be obtained by a simple circuitry.

What is claimed is:

1. A reproducing method for reproducing information from an optical disc having a pit recording area recorded with various control information by a prepit, and a user recording area having a guide groove as a track, the method comprises the steps of:

irradiating a laser beam from a light source on the disc;
   receiving reflection light from the disc by a light detector, wherein the light detector having four areas defined as first area to fourth area in a first direction of a tangential line of the track and in a second direction orthogonal to the tangential line, and wherein a first pair of a first area and a second area and a second pair of a third area and a fourth area are both aligned in the first direction, a third pair of the first area and the fourth area and a fourth pair of the second area and the third area are both aligned in the second direction;

detecting a pit signal as a control information signal in a form of a tangential push-pull reproduced signal by using the third pair and fourth pair, when the laser beam is irradiated on the pit recording area, wherein the tangential push-pull reproduced signal is the difference of pit signals detected by the third pair and fourth pair;

detecting a user information signal as an aggregated signal by using every first to fourth area, when the laser beam is irradiated on the user recording area, wherein the aggregated signal is the aggregation of signals detected by every first to fourth area; and decoding the tangential push-pull reproduced signal or the aggregated signal.

2. A reproducing method as claimed in claim 1, wherein said decoding step obtains a signal equalized in a desirable partial response characteristic from the tangential push-pull reproduced signal by using a waveform equalizing circuit.

3. A reproducing method as claimed in claim 1, wherein said decoding step decodes the tangential push-pull reproduced signal and the aggregated signal by using a viterbi decoder.

4. A reproducing method as claimed in claim 2, wherein a partial response polynomial equation for equalizing the tangential push-pull reproduced signal in the partial response characteristic is $1+D-D^2-D^3$.

5. A reproducing method as claimed in claim 2, wherein said decoding step decodes the tangential push-pull reproduced signal and the aggregated signal by using a viterbi decoder.

6. A reproducing method as claimed in claim 3, wherein a partial response polynomial equation for equalizing the tangential push-pull reproduced signal in the partial response characteristic is $1+D-D^2-D^3$.

* * * * *